United States Patent
Arnold et al.

(10) Patent No.: US 8,423,969 B2
(45) Date of Patent: Apr. 16, 2013

(54) INHERITANCE BREAKPOINTS FOR USE IN DEBUGGING OBJECT-ORIENTED COMPUTER PROGRAMS

(75) Inventors: Jeremy Alan Arnold, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1433 days.

(21) Appl. No.: 12/048,784

(22) Filed: Mar. 14, 2008

(65) Prior Publication Data

US 2008/0163179 A1  Jul. 3, 2008

Related U.S. Application Data

(63) Continuation of application No. 09/998,511, filed on Nov. 30, 2001, now Pat. No. 7,398,519.

(51) Int. Cl.
*G06F 9/44* (2006.01)
*G06F 9/45* (2006.01)

(52) U.S. Cl.
USPC ............ 717/129; 717/100; 717/130; 717/158

(58) Field of Classification Search .................. None
See application file for complete search history.

(56) References Cited

U.S. PATENT DOCUMENTS

| | | |
|---|---|---|
| 4,796,258 A | 1/1989 | Boyce et al. |
| 4,866,665 A | 9/1989 | Haswell-Smith |
| 4,885,717 A | 12/1989 | Beck et al. |
| 5,093,914 A | 3/1992 | Coplien et al. |
| 5,124,989 A | 6/1992 | Padawer et al. |
| 5,321,828 A | 6/1994 | Phillips et al. |
| 5,560,009 A | 9/1996 | Lenkov et al. |
| 5,590,330 A | 12/1996 | Coskun et al. |
| 5,630,049 A | 5/1997 | Cardoza et al. |
| 5,740,440 A | 4/1998 | West |
| 5,754,839 A | 5/1998 | Pardo et al. |
| 5,778,230 A | 7/1998 | Wimble et al. |
| 5,815,415 A * | 9/1998 | Bentley et al. ................. 703/4 |
| 5,815,653 A | 9/1998 | You et al. |
| 5,845,125 A * | 12/1998 | Nishimura et al. ........... 717/129 |
| 5,926,638 A | 7/1999 | Inoue |
| 5,940,616 A | 8/1999 | Wang |

(Continued)

OTHER PUBLICATIONS

Koch et al., Breakpoints and breakpoint detection in source-level emulation, Apr. 1998, 22 pages, <http://delivery.acm.org/10.1145/300000/290843/p209-koch.pdf>.*

(Continued)

*Primary Examiner* — Thuy Dao
(74) *Attorney, Agent, or Firm* — Wood, Herron & Evans, LLP

(57) ABSTRACT

An apparatus and program product utilize an inheritance breakpoint to assist in debugging an object-oriented computer program having a method identified in a base class or interface and implemented by at least one method implementation in another class. Creation of an inheritance breakpoint for a particular method responsive to a user request typically results in the automated generation of a breakpoint for all or a subset of the implementations of that method, often freeing a user from having to manually determine what particular implementation(s) implement that method. In many environments, the automated generation of implementation breakpoints may be performed during initial loading of classes within which such implementations may be defined.

12 Claims, 5 Drawing Sheets

U.S. PATENT DOCUMENTS

| | | | |
|---|---|---|---|
| 6,011,917 A * | 1/2000 | Leymann et al. | 717/104 |
| 6,044,305 A | 3/2000 | Larson et al. | |
| 6,077,312 A | 6/2000 | Bates et al. | |
| 6,091,896 A | 7/2000 | Curreri et al. | |
| 6,158,045 A | 12/2000 | You | |
| 6,189,140 B1 | 2/2001 | Madduri | |
| 6,240,545 B1 | 5/2001 | Carmichael et al. | |
| 6,240,549 B1 | 5/2001 | Hamada et al. | |
| 6,266,805 B1 | 7/2001 | Nwana et al. | |
| 6,266,806 B1 | 7/2001 | Hurd et al. | |
| 6,378,125 B1 | 4/2002 | Bates et al. | |
| 6,381,735 B1 * | 4/2002 | Hunt | 717/158 |
| 6,550,056 B1 | 4/2003 | Mizumoto et al. | |
| 6,629,123 B1 | 9/2003 | Hunt | |
| 6,681,384 B1 | 1/2004 | Bates et al. | |
| 6,691,298 B1 * | 2/2004 | Russo et al. | 717/100 |
| 6,718,484 B1 | 4/2004 | Kodera | |
| 6,823,518 B1 | 11/2004 | Bliss et al. | |
| 6,941,545 B1 * | 9/2005 | Reese et al. | 717/130 |
| 7,370,315 B1 * | 5/2008 | Lovell et al. | 717/100 |
| 7,398,519 B2 * | 7/2008 | Arnold et al. | 717/129 |
| 2001/0004766 A1 | 6/2001 | Koyama | |
| 2002/0152455 A1 * | 10/2002 | Hundt et al. | 717/131 |
| 2003/0106045 A1 * | 6/2003 | Arnold et al. | 717/129 |
| 2003/0115584 A1 * | 6/2003 | Fahs et al. | 717/158 |
| 2003/0163597 A1 * | 8/2003 | Hellman et al. | 709/316 |
| 2004/0111707 A1 * | 6/2004 | Bliss et al. | 717/129 |
| 2005/0273765 A1 | 12/2005 | Arnold et al. | |

OTHER PUBLICATIONS

Nathan Fiedler, "New breakpoint design", Mar. 24, 2001 http://web.archive.org/web/20010722002026/http://www.bluemarsh.com/pipermail/jswat-dev/2001-March/000064.html.

Montlick, Terry, "What is Object-Oriented Software?", Software Design Consultants, LLC, (1995-1999) downloaded Jul. 9, 2001, http://catalog.com/softinfo/objects.html, pp. 1-7.

"Breakpoint", "Inheritance", "Interface" and "Object-Oriented Programming", FOLDOC downloads from Jul. 9, 2001, http://foldoc.coc.ic.ac.uk/foldoc/foldoc.cgi?, 4 pages.

* cited by examiner

INHERITANCE BREAKPOINTS FOR USE IN DEBUGGING OBJECT-ORIENTED COMPUTER PROGRAMS

CROSS-REFERENCE TO RELATED APPLICATIONS

This application is a continuation of U.S. patent application Ser. No. 09/998,511, filed on Nov. 30, 2001, by Jeremy Alan Arnold et al. (ROC920010096US1), the entire disclosure of which is incorporated by reference herein.

FIELD OF THE INVENTION

The invention is generally related to computers and computer software. More specifically, the invention is generally related to debugging computer programs, particularly in the field of object-oriented programming (OOP) technology.

BACKGROUND OF THE INVENTION

Debuggers are software tools that can be used to diagnose computer programs and trace errors that arise during execution of the program. Debuggers are commonly used during the development of computer programs, to verify that a program under development operates as intended.

Conventional debuggers typically support two primary operations to assist a computer programmer in debugging program code. A first operation supported by conventional debuggers is a "step" function, which permits a computer programmer to process instructions (also known as "statements") in a computer program one-by-one, and see the results upon completion of each instruction. While the step operation provides a programmer with a large amount of information about a program during its execution, stepping through hundreds or thousands of program instructions can be extremely tedious and time consuming, and may require a programmer to step through many program instructions that are known to be error-free before a set of instructions to be analyzed are executed.

To address this difficulty, a second operation supported by conventional debuggers is a breakpoint operation, which permits a computer programmer to identify with a "breakpoint" a precise instruction for which it is desired to halt execution of a computer program during execution. As a result, when a computer program is executed by a debugger, the program executes in a normal fashion until a breakpoint is reached, and then stops execution and displays the results of the computer program to the programmer for analysis.

Typically, step operations and breakpoints are used together to simplify the debugging process. Specifically, a common debugging operation is to set a breakpoint at the beginning of a desired set of instructions to be analyzed, and then begin executing the program. Once the breakpoint is reached, the program is halted, and the programmer then steps through the desired set of instructions line by line using the step operation. Consequently, a programmer is able to quickly isolate and analyze a particular set of instructions without having to step through irrelevant portions of a computer program.

In traditional debuggers, breakpoints are generally set on specific statements within functions or methods; program execution is suspended each time the particular statement is called. In some environments, breakpoints may also be specified to be "conditional" so that execution is suspended by a breakpoint only when a particular condition associated with that breakpoint is met (e.g., after the breakpoint has been hit X times).

Statement-based breakpoints have been found to be very useful for debugging program bugs and inefficiencies in traditional procedural languages that are sequential in nature. However, object-oriented languages, which have found increasing acceptability as programming languages, are based on quite a different concept.

Object-oriented programs are typically created using a set of language tools, abstractions and constructs that support a particular form of user-defined type called a "class". A class functions as a template, and associates a collection of declared data with a set of operations capable of being performed on that data, i.e., methods capable of being called on the data. In an object-oriented program, objects are dynamically created during runtime using the classes as templates. The creation of a new object is often referred to as "instantiation," whereby an object is an "instance" of a class.

A fundamental feature of object-oriented programming is that classes can be related to one another by inheritance. The properties, behaviors, data and operations of a parent class, i.e., a "base class" or "superclass", may be inherited without modification by some child class, or "derived class" or "subclass", or the behavior, properties and operations may be selectively refined under the control of the programmer in the derived class. The latter function is generally referred to as overriding. When defining a derived class, one may start by building on an existing base class that is similar to the one to be created. The derived class inherits the implementation and behavior of the base class, including its methods and data, except as modified by overriding amendments detailed in the derived class definition. Several classes can inherit the behaviors of a common parent, and in some object-oriented languages a derived class may inherit from more than one base class.

Moreover, in some object-oriented programming environments, a developer is permitted to separate a public "interface" for a class from the specifics of its implementation. The public interface represents the externally-accessible attributes of a class, typically specifying what methods need to be provided in any implementations of the class. Actual program code for the defined methods in an interface is not provided within the interface. Instead, a programmer is required to incorporate the actual program code that implements any defined methods within the class that implements the interface. Thus, for example, an application that relies on a database might define an interface to specify the methods that need to be supported to access the database. Individual classes that implement the interface for different types of databases might then be created by the vendors of those databases to provide the actual program code that appropriately accesses their particular database designs.

Also, some environments support the concepts of "abstract" classes, which themselves cannot be instantiated, but which can serve as templates for any subclasses so that any method and data incorporated in the abstract classes will be inherited within the subclasses. Unless overridden in particular subclasses, the methods defined in abstract classes are inherited in the same manner as the methods defined in non-abstract classes.

It is important to note that, regardless of wherever a method identified in a class, abstract class or interface is implemented, the name, or identifier, of that method typically remains the same. As a result, whenever a program makes a call to a particular method, it may not be readily apparent to a programmer exactly what implementation of that method will be executed as a result of the call. Therefore, in order to debug that section of a program, a programmer may be required to hunt through the program to locate all of the possible implementations of a method and manually set breakpoints on those implementations.

However, in a working program, tens or hundreds of classes may be utilized, with those classes interrelated with one another via a complex hierarchy. As a result, manually hunting through a program to locate all possible implementations of a method can be extremely time consuming, and can present the risk that a programmer may miss some of the implementations.

Therefore, a significant need has arisen in the art for an improved manner of debugging object-oriented computer programs. In particular, a significant need has arisen for a manner of assisting a programmer in identifying what implementations of methods are being executed while debugging object-oriented computer programs.

SUMMARY OF THE INVENTION

The invention addresses these and other problems associated with the prior art by providing an apparatus, program product, and method of debugging an object-oriented computer program that utilize "inheritance" breakpoints to halt the execution of a computer program whenever an implementation of a method is reached during execution of the computer program. Specifically, consistent with one aspect of the invention, an inheritance breakpoint is associated with a particular program entity in a computer program that identifies a method, but is capable of halting execution of the computer program in response to reaching an implementation of that method that is defined in a program entity other than that with which the inheritance breakpoint is specifically associated.

In some embodiments consistent with the invention, the program entity with which the inheritance breakpoint is associated is an interface that identifies a particular method, whereby the other program entity that implements the method is a class that implements the interface. In other embodiments, the program entity with which the inheritance breakpoint is associated is a class that identifies (and possibly also implements) a particular method, whereby the other program entity that implements the method is another class that inherits from the class with which the inheritance breakpoint is associated.

Using the aforementioned inheritance breakpoints, a programmer is permitted, for example, to set an inheritance breakpoint for a particular method, and then have that inheritance breakpoint trigger a halting of execution whenever any of the implementations of that method are reached during execution of the computer program. As such, a programmer may be relieved of the burden of hunting through lengthy program code to locate each implementation of a method whenever a programmer is unsure as to which implementation of a method will be executed in response to a given method call.

Consistent with another aspect of the invention, a user may provide user input to halt program execution during debugging in response to reaching any of a plurality of implementations of a method in an object-oriented computer program. Thereafter, a breakpoint may be set for at least a subset of the plurality of implementations such that execution of the object-oriented computer program will be halted in response to reaching any of the implementations on which a breakpoint has been set. In some embodiments, for example, the breakpoints may be set during class loading, such that individual breakpoints are set on each implementation of a given method that is found in a particular class that is being loaded.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Figure 1:
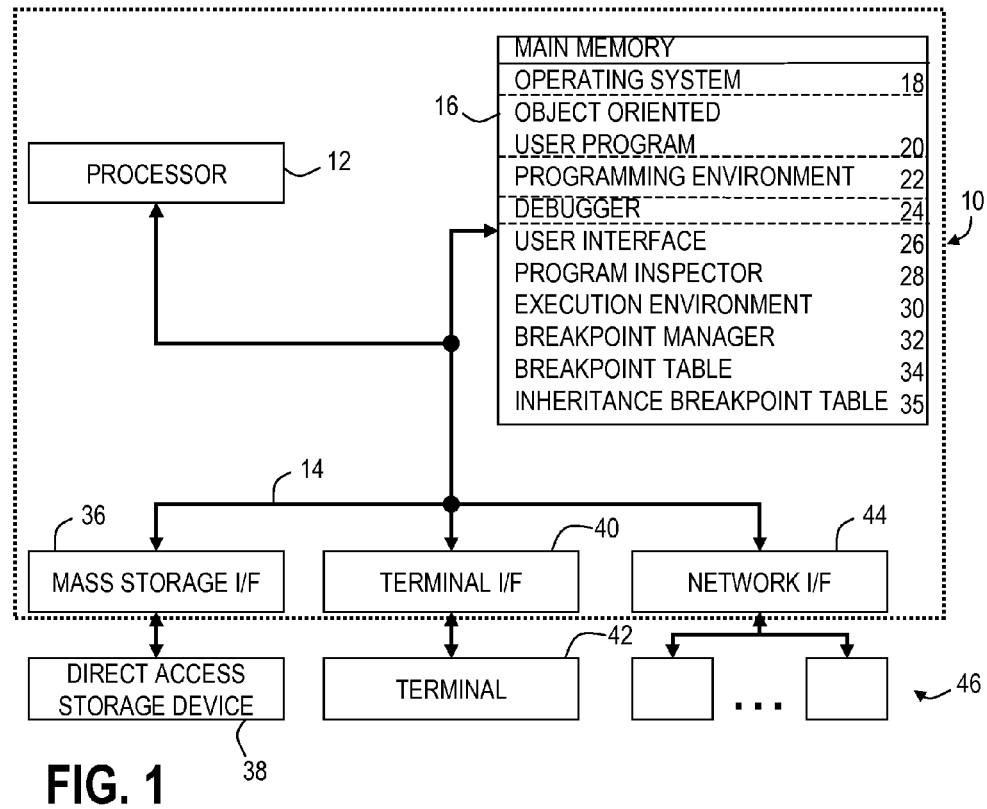
FIG. 1 is a block diagram of a computer system incorporating a debugger supporting inheritance breakpoints consistent with the invention.

The embodiments illustrated hereinafter facilitate the debugging of object-oriented computer programs through the use of "inheritance" breakpoints that enable a user to halt program execution of an object-oriented computer program in response to reaching any of a plurality of implementations of a method defined in the program. As will become more apparent below, an inheritance breakpoint is typically associated with a particular program entity in a computer program that identifies a method, and is often additionally associated with the method itself. Then, during program execution under debug, the program is halted whenever any of the implementations of the method are reached, even for implementations that are incorporated into program entities other than that with which the inheritance breakpoint is associated.

A program entity with which an inheritance breakpoint may be associated may be any of a number of different program structures supported by an object-oriented programming environment within which a method may be identified and/or defined, e.g., a class, an abstract class, an interface, etc. Moreover, a program entity within which an implementation of a method may be incorporated may include any program structure capable of including program code that implements a method, typically a class. As such, the program entities within which an inheritance breakpoint is associated, and within which a method is implemented, may be related as interface-implementing class, superclass-subclass (wherein one class is a child, grandchild, great-grandchild, etc. of the other), abstract class-implementing class, etc.

As will become more apparent below, one manner in which an inheritance breakpoint may be implemented is through the use of individual "implementation" breakpoints that are automatically set in the program code of an object-oriented computer program on behalf of an inheritance breakpoint. Typically, the implementation breakpoints may be set, managed and processed in much the same manner as conventional breakpoints. The implementation breakpoints may be set in the program code at the same time that a user requests that an inheritance breakpoint be set, or in the alternative, the implementation breakpoints may be set at a later time, e.g., dynamically during execution of the object-oriented program. For example, in a dynamically-loaded environment such as Java, where classes are dynamically loaded on an as-needed basis, the implementation breakpoints may be set on a class-by-class basis, and in connection with the initial loading of each class.

Other manners of implementing an inheritance breakpoint may be used in the alternative, however. For example, it may be desirable in some environments to utilize a debugger to intercept all method calls in a program during execution, and determine if the called method is listed in a table of inheritance breakpoints, whereby separate implementation breakpoints would not be required. Moreover, in some embodiments, inheritance breakpoints per se may not be utilized. Rather, a user may simply request that breakpoints be set on all implementations of a particular method, with the functionality described herein utilized to identify all implementations and set implementation breakpoints on each such implementation.

Turning now to the Drawings, wherein like numbers denote like parts throughout the several views, FIG. 1 illustrates a computer system 10 suitable for utilizing inheritance breakpoints consistent with the invention. Computer system 10 is shown for a multi-user programming environment that includes at least one processor 12 that obtains instructions or op codes, and data via a system bus 14 from a main memory 16. Computer system 10 may be implemented as a PC-based server, a minicomputer, a midrange computer, a mainframe computer, etc. In other embodiments, however, computer system 10 may be implemented using practically any other type of computer or programmable electronic device, including single-user computers such as desktop computers, laptop computers, handheld computers, etc.

Processor 12 may represent one or more processors (e.g., microprocessors), and memory 16 may represent the random access memory (RAM) devices comprising the main storage of computer system 10, as well as any supplemental levels of memory, e.g., cache memories, non-volatile or backup memories (e.g., programmable or flash memories), read-only memories, etc. In addition, memory 16 may be considered to include memory storage physically located elsewhere in computer system 10, e.g., any cache memory in a processor 12, as well as any storage capacity used as a virtual memory, e.g., as stored on a direct access storage device 38 or on another computer coupled to computer system 10 via a network 46. Furthermore, practically any interconnect architecture, or collection of interconnect architectures, may be used to implement system bus 14 consistent with the invention.

Memory 16 is shown having resident therein an operating system 18, an object-oriented user program 20, and a programming environment 22 (e.g., an Integrated Development Environment (IDE)). The programming environment 22 typically provides tools for creating, editing, compiling and debugging the user program 20.

As such, among the tools supported by programming environment 22 is a debugger 24 that monitors and interfaces with program execution to diagnose the user program 20. The debugger 24 includes a user interface 26, a program inspector 28, an execution environment 30, a breakpoint manager 32, a breakpoint table 34, and an inheritance breakpoint table 35, the use and configuration of each of which is described in greater detail below.

In the illustrated embodiment, the debugger 24 is illustrated as being resident on the same platform upon which the user program 20 runs. In other embodiments, however, a debugger may be resident on a different platform than a programming and/or execution environment, e.g., when debugging embedded systems, or debugging server-based programs, on a programmer's workstation.

FIG. 1 also illustrates that computer system 10 also may include various interfaces for coupling the computer system to various external devices. For example, a mass storage interface 36 interfaces computer system 10 to one or more mass storage devices 38, e.g., a direct access storage device (DASD). In addition, a terminal interface 40 interfaces computer system 10 to one or more terminals or workstations 42, and a network interface 44 interfaces computer system 10 to one or more networks 46. Any number of alternate computer architectures, incorporating other collections of external devices, may be used in the alternative.

The discussion hereinafter will focus on the specific routines utilized to implement the herein-described debugger functionality. In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, magnetic tape, optical disks (e.g., CD-ROM's, DVD's, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Figure 2:
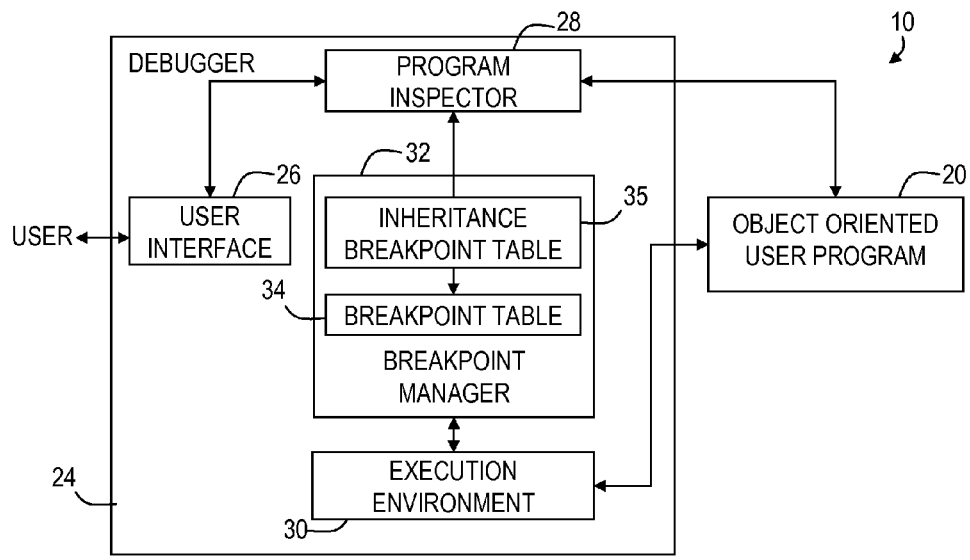
FIG. 2 is a block diagram of the principal software components in the debugger of FIG. 1.

The principal components in debugger 24 are illustrated in FIG. 2, showing the relationship between each of these components and user program 20. User interface 26 provides the mechanism through which user input may be received from a user (e.g., a programmer, developer or other person debugging a program), as well as the mechanism through which information such as debugging information can be presented to the user. Program inspector 28 is used to derive important information about a program, e.g., the class hierarchy, or relationship of classes, interfaces, etc., within the program.

Execution environment 30, which in the illustrated implementation is considered part of debugger 24, provides the underlying platform through which user program 20 is executed in the debugger. In other applications, the execution environment may be implemented in a separate application that is interfaced with the debugger.

Breakpoint manager 32 provides breakpoint management functionality for debugger 24, and it is within this module, along with the execution environment 30, that much of the inheritance breakpoint functionality is implemented in the illustrated embodiment. It will be appreciated that a wide variety of other debugging tools may also be incorporated into debugger 24, including, for example, support for watches (allowing a user to see the current value for a particular variable), code stepping (allowing the user to execute a single line or instruction at a time), etc. These additional functions have been omitted from FIG. 2, however, as they are not particularly relevant to an understanding of the use of creation breakpoints consistent with the invention.

In the illustrated embodiment, breakpoint manager 32 supports conventional breakpoints, as well as inheritance breakpoints consistent with the invention. Moreover, any type of breakpoint may be associated with a condition, as is well known in the art. Included within the breakpoint manager is typical functionality for setting breakpoints, removing breakpoints, and processing breakpoints when they are hit while the object-oriented program is executed in the execution environment. Inheritance breakpoints consistent with the invention may be implemented more or less as extensions to conventional breakpoints in the illustrated embodiment. However, in other embodiments, inheritance breakpoints may be handled completely separate from conventional breakpoints.

As is also shown in FIG. 2, separate breakpoint and inheritance breakpoint tables 34, 35 are supported, the former for conventional-type breakpoints (some of which are generated automatically on behalf of an inheritance breakpoint, as will be discussed below) and the latter for inheritance breakpoints. In the alternative, tables 34, 35 may be incorporated into the same table or other appropriate data structure.

Figure 3:
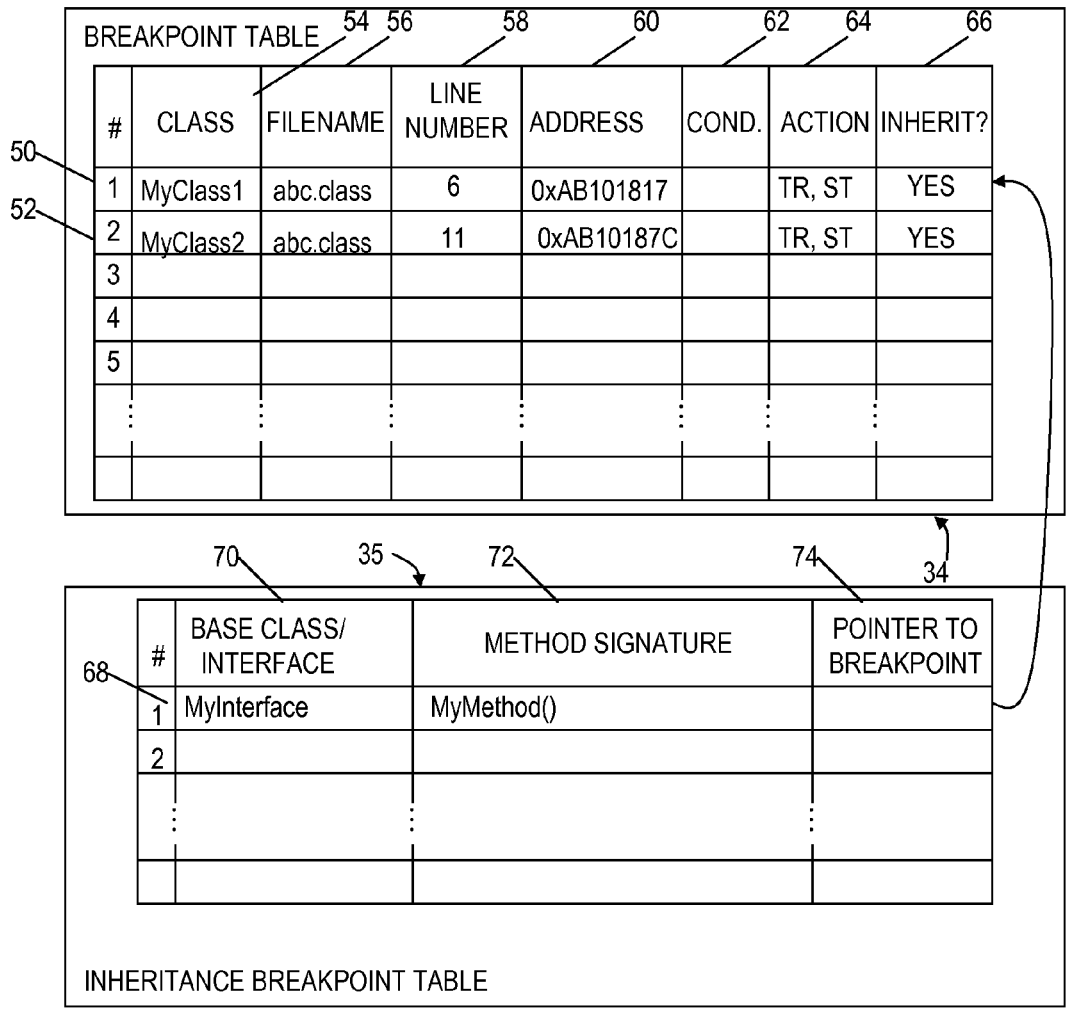
FIG. 3 is an exemplary data structure implementation for the breakpoint table of FIG. 2.

Now turning to FIG. 3, an exemplary implementation of breakpoint table 34 is illustrated in greater detail. Breakpoint table 34 includes a plurality of entries (e.g., entries 50, 52), each including a plurality of fields 54-64. In the illustrated implementation, breakpoint table 34 defines both conventional-type breakpoints, as well as the system-created breakpoints, also referred to herein as implementation breakpoints, that are generated on behalf of inheritance breakpoints during class loading. In the alternative, the implementation breakpoints may be managed and stored separately from conventional-type breakpoints.

Fields 54, 56, 58 and 60 respectively store the class, file name, source code line number, and executable code address that identify a specific breakpoint, and that provide a mapping between the location of the breakpoint in the source code and in the executable code, e.g., so the appropriate source code may be displayed in response to hitting the breakpoint during execution of the executable code. It should be appreciated that other combinations of identifiers may be utilized to identify the position of each breakpoint in the source and/or executable code.

Field 62 stores an optional condition to be associated with a breakpoint, and field 64 stores one or more actions to be performed in response to hitting the breakpoint, e.g., initiating a trace operation, halting execution, displaying debug information, logging debug information to a file or socket, etc. Various additional types of conditions and resulting actions are well understood in the art.

Field 66 stores a flag indicating whether the breakpoint is an implementation breakpoint, and thus associated with an inheritance breakpoint in table 35. In the alternative, a pointer or other reference to an entry in table 35 may be stored in field 64. In other embodiments, no explicit indication of a linkage between the implementation and inheritance breakpoints may be used.

Additional information may be stored in a breakpoint table entry consistent with the invention. For example, where a breakpoint is implemented by inserting an invalid opcode in an executable program, the breakpoint table entry may include the original opcode to execute once the program is restarted.

Inheritance breakpoint table 35 can likewise include a plurality of entries, e.g., entry 68. Each entry may include, for example, fields 70 and 72 that respectively store the base class, abstract class, or interface, and the specific method (typically including the method's signature), upon which an inheritance breakpoint is set.

In addition, each entry may optionally include a field 74 that stores a pointer or other reference to each implementation breakpoint associated with the inheritance breakpoint for that entry. Doing so would assist a user (or a system) in locating all of the implementations of a particular method. Other information may be stored in each entry 66, as will be apparent to one of ordinary skill in the art having the benefit of the instant disclosure.

It will be appreciated that a wide variety of alternate data structures may be utilized to store the breakpoint information utilized in connection with inheritance breakpoints consistent with the invention. Therefore, the invention is not limited to the particular data structures described herein.

Figure 4:
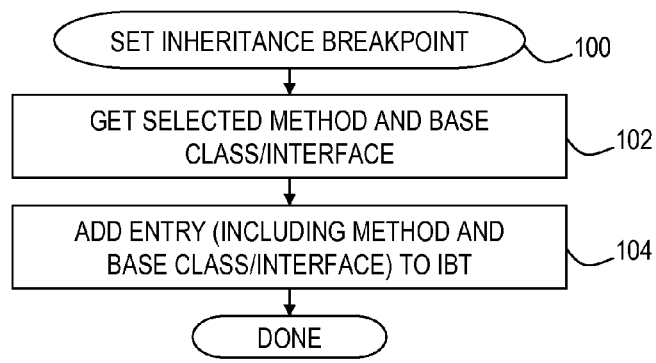
FIG. 4 is a flow diagram for a set inheritance breakpoint routine executed by the debugger of FIG. 2.

To implement inheritance breakpoints consistent with the invention, a number of routines are supported by breakpoint manager 32 of FIG. 2. FIG. 4, for example, illustrates a set inheritance breakpoint routine 100, which is utilized to set an inheritance breakpoint in the debugger 24 via interaction by a user through user interface 26 (FIG. 2). Routine 100 may be initiated via any number of user input operations, e.g., via a graphical user interface control such as a button, menu, pop-up menu, etc., or via a command line command, a keystroke combination, or other user input operation known in the art. As discussed in greater detail below, routine 100 may be initiated in response to user-selection of a command from a context or pop-up menu displayed to a user that selects a particular method call or definition in a source code display of a user program.

Routine 100 begins in block 102 by obtaining the identifier for the method selected by the user, as well as its base class or interface. As mentioned above, the identifier of the method may be obtained based upon the context upon which the user invokes routine 100, e.g., based upon the particular source code element that a user has selected when invoking routine 100.

In addition, the base class or interface may be obtained based upon a similar context. For example, when a context menu is opened on a particular method definition, the base class or interface within which the method definition resides may be selected as the associated base class or interface. Also, the system may generate a list of methods in a particular class, interface, package or program and allow the user to select from among the displayed methods.

In the alternative, a user may specify either or both of the method and its base class or interface after invoking routine 100, e.g., in response to a second pop-up menu of a dialog box presentation that occurs after invoking routine 100.

Once the method and base class or interface have been identified, control passes to block 104 to add an entry in inheritance breakpoint table 35 (FIG. 3) with the appropriate identifiers stored in fields 68 and 70 of the entry. Routine 100 is then complete.

Typically, once an inheritance breakpoint is set, no implementation breakpoints are initially set for that inheritance breakpoint in breakpoint table 34. Instead, the setting of implementation breakpoints occurs dynamically, during the class loading that occurs during execution of a program under debug. It will be appreciated, however, that in some embodiments, e.g., non-dynamic programming environments, it may be desirable to automatically generate the implementation breakpoints at the same time that an inheritance breakpoint is created.

It may also be desirable to associate a condition with an inheritance breakpoint, and as such, routine 100 may be configured to receive a condition from a user, e.g., via a dialog box displayed after invocation of routine 100. Upon receiving the selected condition, the condition may be stored in an entry 68 in inheritance breakpoint table 35, or in the alternative, the condition may be stored in field 62 of an entry 50, 52 in breakpoint table 34. Any type of condition commonly utilized in connection with breakpoints may be utilized as a condition for an inheritance breakpoint consistent with the invention.

Figure 5:
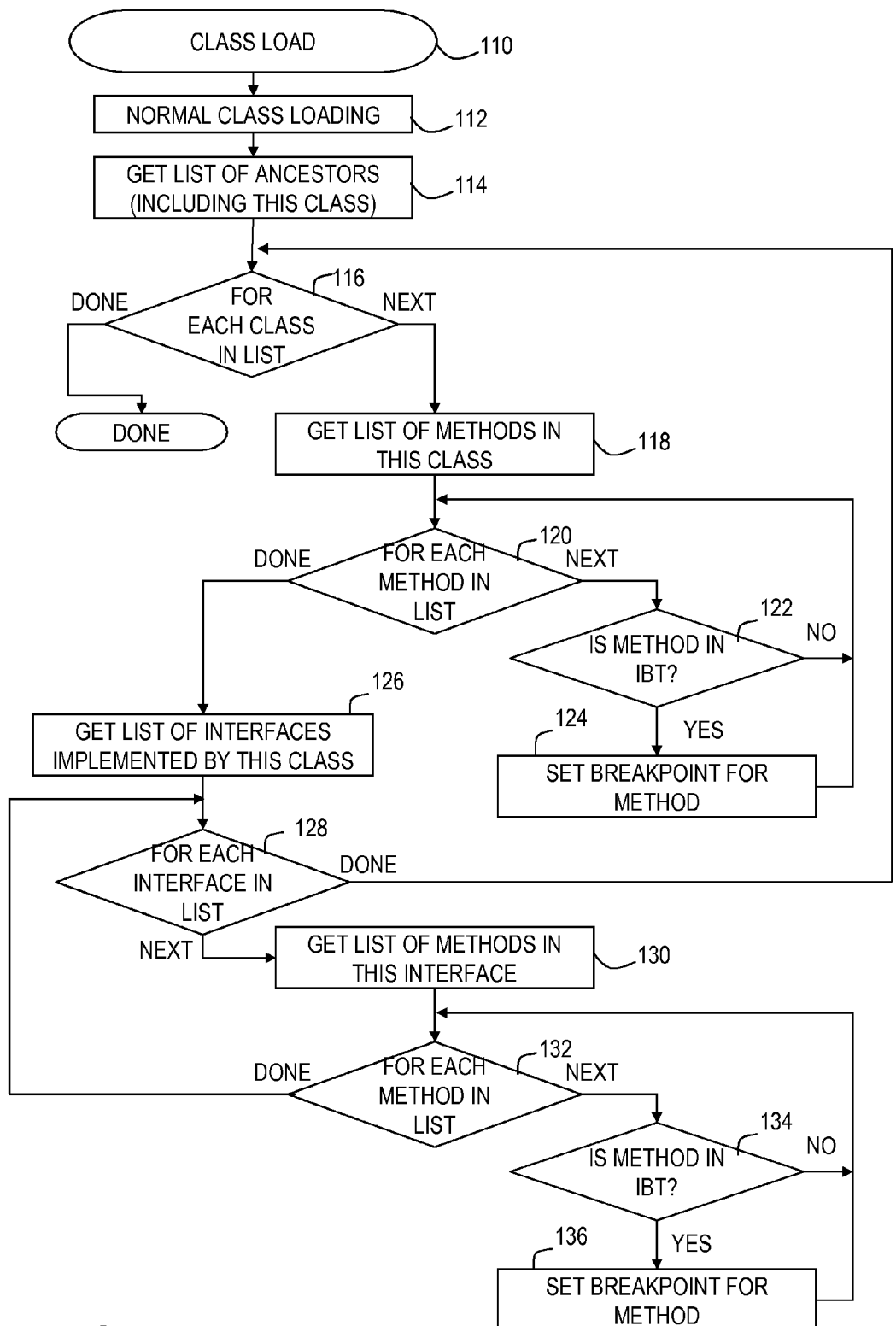
FIG. 5 is a class load routine executed by the debugger of FIG. 2.

FIG. 5 next illustrates the operation of a class load routine 110 that is executed in response to the initial class load of a class or class file during execution of a program under debug. Routine 110 represents an extension of a dynamic class loading operation that occurs in connection with a number of different program environments, e.g., the Java program environment. As such, routine 110 typically begins by performing normal class loading operations as illustrated in block 112, the use and configuration of which is well known in the art. After normal class loading, routine 110 proceeds to block 114 to obtain a list of the ancestors of the class being loaded, including the class itself. Any number of mechanisms may be used to determine the class hierarchy of a program, and thus to determine information such as the ancestors, interfaces, etc., with which a method or class is associated. For example, in a Java programming environment, program inspector 28 may use Java reflection API's, the use and configuration of which are known in the art. In other embodiments, other mechanisms may be used to determine what ancestors and interfaces exist for a particular class.

Next, a loop is initiated in block 116 to process each class identified in the list. For each such class, control passes to block 118 to obtain a list of the methods in the class, and then to block 120 to initiate a FOR loop to process each method in the list.

For each such method, control passes to block 122 to determine whether the method is identified in the inheritance breakpoint table. If not, control returns to block 120 to process the next method in the list. If, however, the method is identified in the inheritance breakpoint table, control passes to block 124 to set a breakpoint on the method. As discussed above, a breakpoint, also referred to herein as an implementation breakpoint, may be set anywhere in the method, e.g., on the first statement, or may be set on the call to that method. Once the breakpoint has been set, control returns to block 120 to process the next method in the list.

Once all methods in the list have been processed, block 120 passes control to block 126 to obtain a list of interfaces that are implemented by the class being loaded. Next, block 128 initiates a loop to process each interface in the list. For each such interface, control passes to block 130 to obtain a list of methods in the interface. Control then passes to block 132 to initiate a FOR loop to process each method in a list. For each such method, block 132 passes control to block 134 to determine whether the method is included in the inheritance breakpoint table. If not, control returns to block 132 to process additional methods. If it is in the inheritance breakpoint table, however, control passes to block 136 to set an implementation breakpoint for the method. Control then returns to block 132.

Once each method in the list is processed, block 132 passes control to block 128 to process additional interfaces. Once all interfaces have been processed, control then returns to block 116 to process additional classes from the list generated in block 114. Once all such classes have been processed, routine 110 is complete.

It will be appreciated that with the illustrated implementation of routine 110, it is possible that a breakpoint may be set multiple times on a given method (e.g., if a particular method overrides a method in another class that implements a method in another interface). In some environments, therefore, it may be desirable to perform additional checking to eliminate redundant breakpoints. In other embodiments, however, the presence of multiple redundant breakpoints may not be a concern.

Figure 6:
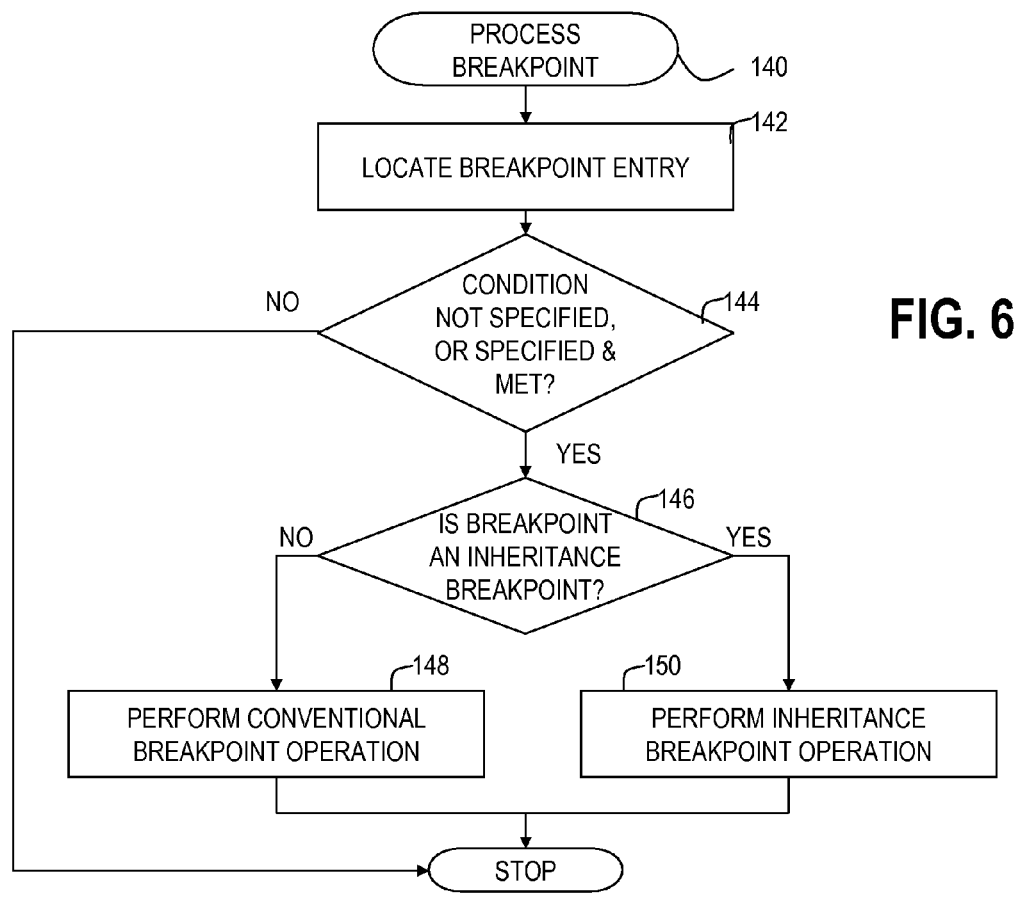
FIG. 6 is a breakpoint hit routine executed by the debugger of FIG. 2.

FIG. 6 next illustrates an exemplary process breakpoint routine 140 that is executed in response to hitting any of the breakpoints in breakpoint table 34 (FIG. 3). Routine 140 begins in block 142 by locating the appropriate breakpoint entry in breakpoint table 34. Next, block 144 determines whether any required condition has been met, or if the breakpoint is unconditional. If a condition is specified but not met, routine 140 terminates without halting execution of the user program. Otherwise, block 144 passes control to block 146 to determine whether the breakpoint is an inheritance breakpoint (e.g., by checking field 66 of the entry). If not, a conventional breakpoint operation is performed in block 148. Otherwise, control passes to block 150 to perform an inheritance breakpoint operation. Upon completion of either of blocks 148, 150, routine 140 is complete.

An inheritance breakpoint operation may vary from a conventional breakpoint operation in that different debugging information may be presented to a user, or a user may otherwise be notified that the particular breakpoint hit is associated with a particular inheritance breakpoint. Otherwise, processing of the inheritance breakpoint operation may be essentially the same as that for conventional breakpoints. In fact, if it is not desirable to separately indicate that a breakpoint is associated with a particular inheritance breakpoint, a purely conventional breakpoint processing operation may be utilized instead of that illustrated in FIG. 6.

Figure 7:
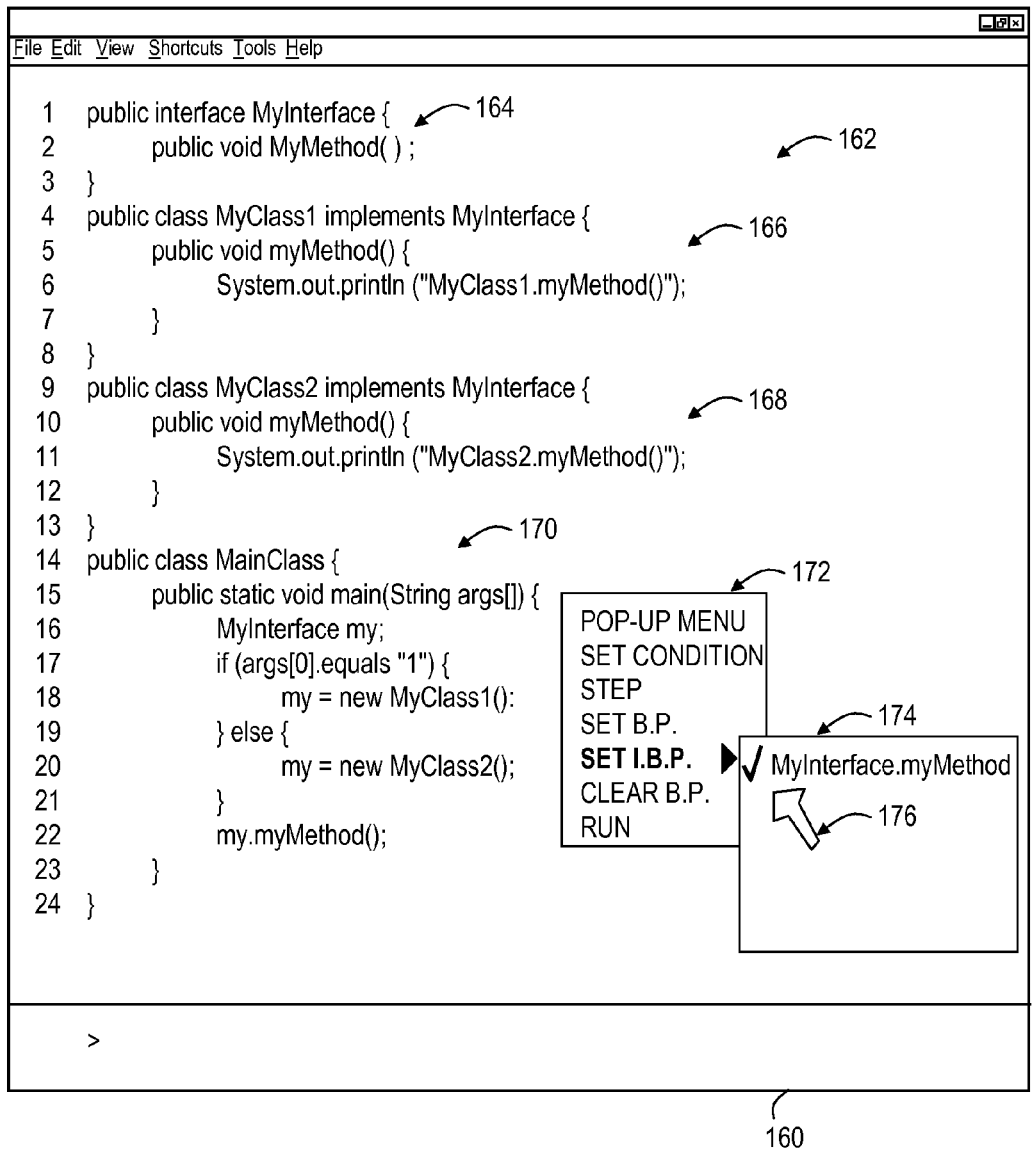
FIG. 7 is an illustrative example of an object-oriented computer program having multiple implementations of a method.

As an example of the operation of debugger 24, FIG. 7 illustrates in a window 160 a portion of a computer program 162 including a definition 164 for an interface ("MyInterface") and two definitions 166, 168 of classes ("MyClass1" and "MyClass2") that implement the MyInterface interface. In this example, an identification of a method "MyMethod( )" is provided at line 2 of interface definition 164, with implementations of that method defined in each of class definitions 166, 168, specifically at lines 5-7 and 10-12 of the program.

FIG. 7 also illustrates a definition of a main class 170, which creates depending upon an input argument, a new MyClass1 or MyClass2 object (lines 17-21), and then calls the MyMethod( ) method on the newly created object a line 22.

Assuming that a user wishes to create an inheritance breakpoint on MyMethod( ), the user may open a pop-up menu 172, e.g., in response to right-clicking on the window, or in a specific area of the window (e.g., on the interface definition). Among the options provided to the user in menu 172 may be an option to create an inheritance breakpoint (I.B.P.), which upon its selection may result in the display of a second menu 174. The user may then be provided with a list of possible methods upon which an inheritance breakpoint may be set, and then through selection of MyInterface.MyMethod( ) by a pointer 176, the inheritance breakpoint may be set. It will be appreciated, however, that any number of alternate user interface interactions, options and controls may be used to permit a user to create an inheritance breakpoint consistent with the invention.

FIG. 3, for example, illustrates the resulting entry 68 that might be created in response to a user request to set the aforementioned inheritance breakpoint on the MyMethod method of the MyInterface interface, whereby the interface and method are identified in fields 70, 72 of the entry.

Assuming, next, that the program is executed, upon initial loading of the appropriate class for which a new object is created in main class 170 (FIG. 7), an entry such as entry 50 or 52 is created to set a breakpoint on the appropriate implementation of the MyMethod( ) method. Then, once the method is called during execution (e.g., at line 22), the breakpoint associated with entry 50 or 52 will be reached, and program execution halted as appropriate.

Various modifications may be made to the illustrated embodiments without departing from the spirit and scope of the invention. For example, rather than setting implementation breakpoints on each possible implementation of a given method associated with an inheritance breakpoint, only a subset of such implementation breakpoints may be generated. Limits may be set for how many implementation breakpoints are set based upon factors such as the number of layers deep in the class hierarchy (e.g., look only at the parent and grandparent classes), the type of implementation (e.g., interface implementations only, overriding implementations only, abstract method overriding implementations, or combinations thereof), the location of classes (e.g., limited to only specific packages), the similarity of code blocks (e.g., only when two implementations are relatively similar in function), the similarity of inheritance (e.g., based upon which combination of interfaces and base classes are implemented and extended), etc. Moreover, selection of which types of implementation breakpoints are generated may be either by the debugger or by the user, and the debugger may only support a subset of the types of implementation breakpoints discussed herein.

Furthermore, it will be appreciated that implementation breakpoints may not be associated with an inheritance breakpoint. Rather, a user may request only that breakpoints be set on all (or a subset) of the implementations of a method, with such breakpoints automatically set at that time via scanning through the entire object-oriented computer program. In such an implementation, no inheritance breakpoints, or separate inheritance breakpoint table, would be required. However, through the association of the implementation breakpoints with an inheritance breakpoint, features such as the dynamic setting of breakpoints during class loading, and breakpoint management actions such as removing breakpoints, are relatively easier to implement.

Other modifications will be apparent to one of ordinary skill in the art having the benefit of the instant disclosure. Therefore, the invention lies in the claims hereinafter appended.

What is claimed is:

1. An apparatus, comprising:
a memory within which is resident at least a portion of an object-oriented computer program under debug, the object-oriented computer program including a first program entity in which is identified a method, and a second program entity that is different from and that depends from the first program entity, and that includes an implementation of the method; and
program code configured to set an inheritance breakpoint that is associated with the first program entity and with the method in response to user input, and to halt execution of the object-oriented computer program during debugging in response to reaching the implementation of the method defined in the second program entity.

2. The apparatus of claim 1, wherein the first program entity is an interface that identifies the method, and wherein the second program entity is a class that implements the method.

3. The apparatus of claim 1, wherein the first program entity is a first class that includes a second implementation of the method, wherein the second program entity is a second class that inherits from the first class, and wherein the first implementation of the method in the second class overrides the second implementation of the method in the first class.

4. The apparatus of claim 1, wherein the first program entity is an abstract class that identifies the method, and wherein the second program entity is a non-abstract class that implements the method.

5. The apparatus of claim 1, wherein the inheritance breakpoint is additionally associated with the method, and wherein the program code is configured to store in a breakpoint data structure an entry that identifies the first program entity and the method.

6. The apparatus of claim 1, wherein the program code is further configured to set a breakpoint on each implementation of the method, and wherein the program code is configured to halt execution of the object-oriented computer program during debugging in response to reaching a breakpoint set on such implementation.

7. The apparatus of claim 6, wherein the program code is configured to set the breakpoint on each implementation of the method by dynamically setting a breakpoint on each implementation of the method in a class in the object-oriented computer program during loading of the class.

8. The apparatus of claim 1, wherein the program code is configured to associate a user-specified condition with the inheritance breakpoint, and wherein the program code is configured to halt execution of the object-oriented computer program during debugging in response to reaching the implementation of the method only if the user-specified condition has been met.

9. An apparatus, comprising:
a memory within which is resident at least a portion of an object-oriented computer program under debug, the object-oriented computer program including a method and a plurality of implementations of the method, wherein the method is identified in a first program entity, and wherein at least one of the plurality of implementations of the method is defined in a second program entity that depends from the first program entity; and
program code configured to receive user input to halt program execution during debugging in response to reaching any of the plurality of implementations of the method, and to thereafter set a breakpoint for at least a subset of the plurality of implementations such that execution of the object-oriented computer program will be halted in response to reaching any of the implementations on which a breakpoint has been set, wherein the user input to halt program execution includes user input to set an inheritance breakpoint on the method, wherein the inheritance breakpoint is associated with the first program entity, and wherein the program code is configured to set a breakpoint for the implementation defined in the second program entity.

10. The apparatus of claim 9, wherein the program code is configured to set a breakpoint by, during loading of a class in the object-oriented computer program, identifying each implementation of the method in the class and setting a breakpoint on such implementation.

11. A program product, comprising:
program code configured to set an inheritance breakpoint in response to user input, wherein the inheritance breakpoint is associated with a first program entity in an object-oriented computer program and a method identified in the first program entity, and to halt execution of the object-oriented computer program during debugging in response to reaching an implementation of the method defined in a second program entity in the object-oriented computer program that is different from and that depends from the first program entity; and
a non-transitory storage medium storing the program code.

12. A program product, comprising:
program code configured to receive user input to halt program execution of an object-oriented computer program during debugging in response to reaching any of a plurality of implementations of a method in the object-oriented computer program, and to thereafter set a breakpoint for at least a subset of the plurality of implementations such that execution of the object-oriented computer program will be halted in response to reaching any of the implementations on which a breakpoint has been set, wherein the method is identified in a first program entity, and wherein at least one of the plurality of implementations of the method is defined in a second program entity that depends from the first program entity, wherein the user input to halt program execution includes user input to set an inheritance breakpoint on the method, wherein the inheritance breakpoint is associated with the first program entity, and wherein the program code is configured to set a breakpoint for the implementation defined in the second program entity in connection with setting the breakpoint for the subset of the plurality of implementations; and
a non-transitory storage medium storing the program code.

* * * * *